US012606236B2

(12) United States Patent
Adachi

(10) Patent No.: US 12,606,236 B2
(45) Date of Patent: Apr. 21, 2026

(54) MIDPOINT CORRECTION DEVICE, MIDPOINT CORRECTION METHOD, AND STORAGE MEDIUM FOR STEERING TORQUE SENSOR

(71) Applicant: TOYOTA JIDOSHA KABUSHIKI KAISHA, Toyota (JP)

(72) Inventor: Masahiko Adachi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 18/936,408

(22) Filed: Nov. 4, 2024

(65) Prior Publication Data

US 2025/0249953 A1 Aug. 7, 2025

(30) Foreign Application Priority Data

Feb. 6, 2024 (JP) ................................. 2024-016438

(51) Int. Cl.
| | |
|---|---|
| *B62D 5/04* | (2006.01) |
| *B62D 1/28* | (2006.01) |
| *B62D 6/10* | (2006.01) |

(52) U.S. Cl.
CPC ........... *B62D 5/0466* (2013.01); *B62D 1/283* (2013.01); *B62D 5/0487* (2013.01); *B60W 2710/202* (2013.01)

(58) Field of Classification Search
CPC ............. B60W 2710/202; B62D 1/283; B62D 5/0466; B62D 5/0481; B62D 5/0487
USPC ......................................................... 701/41
See application file for complete search history.

(56) References Cited

U.S. PATENT DOCUMENTS

| | | | |
|---|---|---|---|
| 8,903,567 B2 | 12/2014 | Morimoto et al. | |
| 10,464,554 B2 | 11/2019 | Okamura et al. | |
| 2017/0029020 A1* | 2/2017 | Baehrle-Miller .. | B62D 15/0245 |
| 2019/0302754 A1 | 10/2019 | Tsuruoka | |
| 2020/0218249 A1 | 7/2020 | Sannodo et al. | |
| 2021/0197772 A1 | 7/2021 | Tsumano | |
| 2023/0014442 A1* | 1/2023 | Bahena ................ | B62D 5/0481 |
| 2023/0066522 A1* | 3/2023 | Hashimoto .......... | B60W 10/10 |
| 2024/0308575 A1* | 9/2024 | Anumula ............. | B62D 5/0466 |

FOREIGN PATENT DOCUMENTS

JP 2009-137514 A 6/2009

* cited by examiner

*Primary Examiner* — Erick R Solis
(74) *Attorney, Agent, or Firm* — SoraIP, Inc.

(57) ABSTRACT

A midpoint correction device for performing midpoint correction of a steering torque sensor, which is applied to a vehicle provided with a EPS device that applies control torque to a steering transmission system between a steering wheel and a steered wheel, and a steering torque sensor provided in the steering transmission system, includes a control unit that includes a nonvolatile storage device and performs remote operation control of the vehicle, and the control unit stores the steering torque detected by the steering torque sensor in the storage device as a midpoint offset amount in a state where the remote operation control is performed, reads the midpoint offset amount from the storage device during traveling of the vehicle, and corrects the steering torque detected by the steering torque sensor with the midpoint offset amount, thereby performing midpoint correction.

5 Claims, 5 Drawing Sheets

START

S10

REMOTE OPERATION CONTROL
IN PROGRESS?

NO

S20    YES

IMPART VIBRATION TORQUE

S30

READ DETECTION VALUE Ts

S40

$|Ts| < |Tsoff| - \alpha$ OR
$|Ts| > |Tsoff| + \alpha$ ?

NO

S50    YES

Ts IS STORED
IN THE STORAGE DEVICE AS
A MIDPOINT OFFSET VALUE Tsoff

S60

$N \leftarrow N+1$

S70

$N \geq Nc$ ?

NO

YES

END

MIDPOINT CORRECTION DEVICE, MIDPOINT CORRECTION METHOD, AND STORAGE MEDIUM FOR STEERING TORQUE SENSOR

CROSS-REFERENCE TO RELATED APPLICATION

This application claims priority to Japanese Patent Application No. 2024-016438 filed on Feb. 6, 2024, incorporated herein by reference in its entirety.

BACKGROUND

1. Technical Field

The disclosure relates to a midpoint correction device, a midpoint correction method, and a storage medium for a steering torque sensor installed in a vehicle such as an automobile.

2. Description of Related Art

A steering torque sensor installed in a vehicle such as an automobile detects, as a steering torque, a torque acting on a steering shaft or the like of a steering transmission system between a steering wheel and a steered wheel. The steering torque is not only used for controlling assist torque of a power steering device, but also is used for cooperative control between steering by a driver and driver assistance control. Accordingly, the steering torque needs to be accurately detected by the steering torque sensor.

The steering torque sensor outputs 0 indicating that the steering torque is 0 when no torque is acting on the steering shaft, and outputs a positive value or a negative value in accordance with a direction and a magnitude of the torque when torque is acting on the steering shaft.

However, even in a situation in which no torque is acting on the steering shaft, there are cases in which the output of the steering torque sensor does not become 0, and so-called midpoint (0 point) offset occurs, due to various external factors. Accordingly, the output of the steering torque sensor in a situation in which it is estimated that no torque is acting on the steering shaft, is obtained as a midpoint offset amount. Thereafter, midpoint correction of the steering torque sensor that corrects the output of the steering torque sensor by the midpoint offset amount is performed. These are known.

For example, in Japanese Unexamined Patent Application Publication No. 2009-137514 (JP 2009-137514 A), the following description is given. Certainty of midpoint detection is confirmed based on variance in detection values of the steering torque sensor when the ignition switch is turned off. The midpoint correction is performed using the detection value of the steering torque sensor after a certain amount of time has elapsed, as the midpoint offset amount.

SUMMARY

However, it is not necessarily true that no torque is acting on the steering shaft when the ignition switch is turned off. Also, although detecting a situation in which no torque is acting on the steering shaft and performing midpoint correction is known, in order to detect a situation in which no torque is acting on the steering shaft, a special device such as a camera or the like that captures images of the driver is necessary.

Meanwhile, in a vehicle capable of automated driving, remote driving such as remote parking may be performed, and the remote driving is performed in a state after the driver has exited the vehicle. Accordingly, when remote driving is being performed, no steering operations by the driver are performed, and accordingly no torque acts on the steering shaft.

The disclosure has been made in light of the fact that no torque acts on the steering shaft during remote driving, and provides a midpoint correction device, a method, and a program, which are capable of performing midpoint correction in a situation in which no torque is acting on the steering shaft, without requiring a special device. According to the disclosure, a midpoint correction device (100) for a steering torque sensor implemented in a vehicle (102) that is equipped with a torque applying device (EPS device 12) for applying control torque to a steering transmission system (34) between a steering wheel (14) and a steered wheel (front wheels 16FL and 16FR), and a steering torque sensor (38) provided in the steering transmission system between the steering wheel and the torque applying device, and that is configured to perform midpoint correction of the steering torque sensor, is provided.

The midpoint correction device includes a control unit (driving assistance ECU 50) for performing remote driving control of the vehicle by communicating with a terminal device (96), in which the control unit includes a nonvolatile storage device (50A), and is configured to perform the midpoint correction by storing, in the storage device, steering torque (Ts) detected by the steering torque sensor in a state in which the remote driving control is performed, as a midpoint offset amount (Tsoff) of the steering torque sensor, reading the midpoint offset amount from the storage device during traveling of the vehicle, and correcting steering torque detected by the steering torque sensor by the midpoint offset amount.

Further, according to the disclosure, there is provided a midpoint correction method of a steering torque sensor, for performing midpoint correction of the steering torque sensor implemented in a vehicle (102) that is equipped with a torque applying device (EPS device 12) for applying control torque to a steering transmission system (34) between a steering wheel (14) and a steered wheel (front wheels 16FL and 16FR), and the steering torque sensor (38) provided in the steering transmission system between the steering wheel and the torque applying device.

The midpoint correction method includes storing, in a situation in which remote driving control of the vehicle is being performed by communicating with a terminal device (96), steering torque (Ts) detected by the steering torque sensor as a midpoint offset amount (Tsoff) of the steering torque sensor, in a nonvolatile storage device (50A) (S10 to S50), and reading the midpoint offset amount from the storage device during traveling of the vehicle (S110 and S120) and correcting steering torque detected by the steering torque sensor by the midpoint offset amount (S130).

Further, according to the disclosure, there is provided a storage medium storing a midpoint correction program for a steering torque sensor (38), the midpoint correction program causing an electronic control unit (driving assistance ECU 50) installed in a vehicle (102) to execute midpoint correction of the steering torque sensor implemented in the vehicle that is equipped with a torque applying device (EPS device 12) for applying control torque to a steering transmission system (34) between a steering wheel (14) and a steered wheel (front wheels 16FL and 16FR), and the steering torque sensor provided in the steering transmission system between the steering wheel and the torque applying device.

The midpoint correction program includes storing, in a situation in which remote driving control of the vehicle is being performed by communicating with a terminal device (96), steering torque (Ts) detected by the steering torque sensor as a midpoint offset amount (Tsoff) of the steering torque sensor, in a nonvolatile storage device (50A) (S10 to S50), and reading the midpoint offset amount from the storage device during traveling of the vehicle (S110 and S120) and correcting steering torque detected by the steering torque sensor by the midpoint offset amount (S130).

According to the midpoint correction device of the steering torque sensor, the method, and the storage medium, the steering torque detected by the steering torque sensor is stored in the nonvolatile storage device as the midpoint offset amount of the steering torque sensor, in a situation in which remote driving control of the vehicle is being performed. In a situation in which remote driving control of the vehicle is being performed, the driver has already exited the vehicle, and accordingly no torque acts on the steering transmission system and the steering torque sensor. Thus, steering torque detected by the steering torque sensor in a situation in which no torque is acting on the steering torque sensor can be stored in the nonvolatile storage device as an accurate midpoint offset amount of the steering torque sensor.

Further, the midpoint offset amount is read from the storage device during traveling of the vehicle, and steering torque detected by the steering torque sensor is corrected by the midpoint offset amount. Accordingly, steering torque detected by the steering torque sensor can be corrected by an accurate midpoint offset amount while the vehicle is traveling.

Further, the vehicle may be any vehicle that is capable of performing remote driving control, and no special device for detecting a situation in which no torque is acting on the steering shaft, such as a camera for capturing images of a driver, for example, is necessary.

In one aspect of the disclosure, the control unit (driving assistance ECU 50) is configured to store, in the storage device (50A), steering torque (Ts) detected by the steering torque sensor (38) after vibration torque is applied to the steering transmission system (34) by the torque applying device (EPS device 12), as a midpoint offset amount (Tsoff) of the steering torque sensor (S20, S50).

According to the above aspect, by applying the vibration torque to the steering transmission system, torque remaining in the steering transmission system is released, and thereafter steering torque detected by the steering torque sensor is stored in the storage device as the midpoint offset amount of the steering torque sensor. Thus, in comparison with when the vibration torque is not applied to the steering transmission system, the concern that the middle point offset amount will be adversely affected by the torque remaining in the steering transmission system is reduced, and the middle point offset amount can be obtained more accurately.

In another aspect of the disclosure, the remote driving control includes at least one of remote parking control, automatic valet parking control, and smart summon control.

According to the above aspect, the remote driving control includes at least one of the remote parking control, the automatic valet parking control, and the smart summon control. Thus, when at least one control thereof is being performed, an accurate midpoint offset amount of the steering torque sensor can be obtained.

In the above description, names and/or symbols used in embodiments of the disclosure are appended in parentheses to configurations of the disclosure corresponding to the embodiments described below, in order to facilitate understanding of the disclosure. However, the components of the disclosure are not limited to the components of the embodiments corresponding to the name and/or symbols appended in parentheses. Other objects, other features, and accompanying advantages of the disclosure will be readily appreciated from the following description of embodiments of the disclosure, which is described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will now be described in detail with reference to the accompanying drawings.

Figure 1:
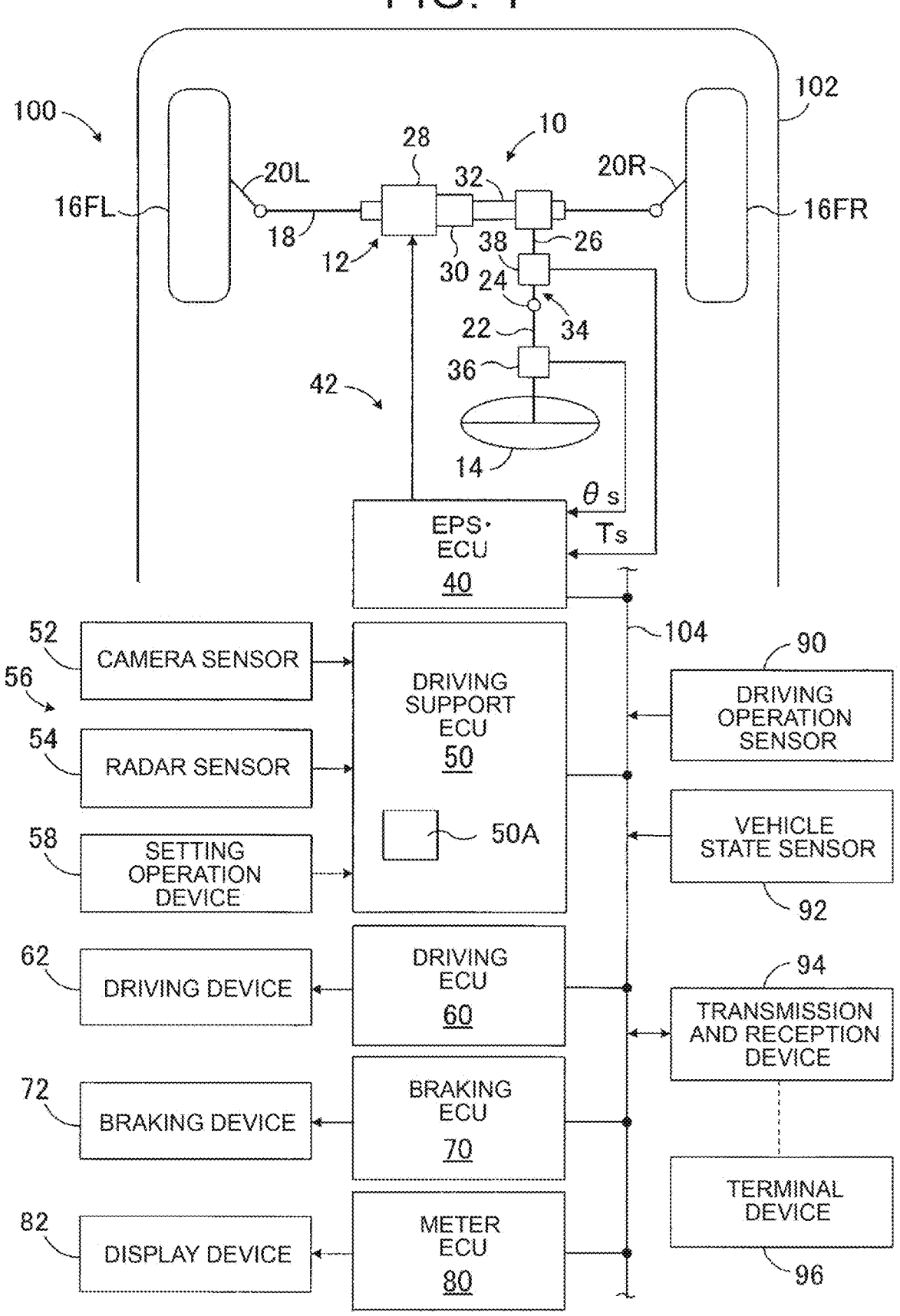
FIG. 1 is a schematic configuration diagram illustrating a midpoint correction device of a steering torque sensor according to an embodiment.

As shown in FIG. 1, the midpoint correction device 100 of the steering torque sensor according to the embodiment is applied to the vehicle 102 and includes a steering device 10, an electric power steering ECU 40, and a driving assistance ECU 50. The vehicle 102 may be a vehicle capable of autonomous driving, and includes a driving ECU 60, a braking ECU 70, and a meter ECU 80. In this specification, the electric power steering is referred to as an abbreviation of Electric Power Steering (EPS) as needed.

ECU such as an EPS·ECU 40 and a driving assistance ECU 50 are Electronic Control Unit including a microcomputer as a main part. ECU such as an EPS·ECU 40 and a driving assistance ECU 50 are connected to each other via a Controller Area Network (CAN) 104 so as to be able to transmit and receive data. The microcomputers include a CPU, ROM, RAM, an interface, and the like. CPU implements various functions by executing instructions (programs, routines) stored in ROM. These ECU may be integrated into one ECU. In particular, the driving assistance ECU 50 includes a readable/writable nonvolatile storage device.

As shown in FIG. 1, the steering device 10 includes an EPS device 12 connected to an EPS·ECU 40. EPS device 12 is configured as a rack-and-pinion type EPS device that is driven in response to a driver operating the steering wheel 14. The rack bar 18 of EPS device 12 is connected via tie rods 20L and 20R to front wheels 16FL and 16FR that are steered wheels knuckle arms (not shown). The steering wheel 14 is connected to the pinion shaft 26 of EPS device 12 via a steering shaft 22 and a universal joint 24.

In the illustrated embodiment, EPS device 12 is a rack-assisted electric power steering device. EPS device 12 includes an electric motor 28 and a conversion mechanism 30. The conversion mechanism 30 converts the rotation and torque of the electric motor 28 into displacement and force in the reciprocating direction and transmits the displacement and force to the rack bar 18. The conversion mechanism 30 is, for example, a belt type. EPS device 12 drives the rack bar 18 relative to the housings 32 to generate control torques.

Therefore, the steering shaft 22, the universal joint 24, the pinion shaft 26, EPS device 12, and the tie-rod 20L, 20R constitute the steering transmission system 34. The steering transmission system 34 transmits the steering displacement/torque between the steering wheel 14 and the front wheel 16FL and 16FR. EPS device 12 functions as a torque applying device that applies a control torque to the steering shaft 22 of the steering transmission system 34.

The steering shaft 22 is provided with a steering angle sensor 36 for detecting the steering angle θs, and the pinion shaft 26 is provided with a steering torque sensor 38 for detecting the steering torque Ts. It is assumed that the steering angle θs and the steering torque Ts are positive when the vehicle 102 turns to the right by the driver's steering operation. Therefore, the steering torque Ts is positive when the relative rotation of the member on the side of the steering wheel 14 and the member on the side of EPS device 12 with respect to the torsion bar (not shown) of the steering torque sensor 38 is the relative rotation corresponding to the right-turning direction of the vehicle.

EPS device 12 may be a pinion-assisted or column-assisted EPS device as long as it can apply control torques to the steering transmission system 34. Further, the steering torque sensor 38 may be provided at any position of the steering transmission system 34 as long as it is provided closer to the steering wheel 14 than EPS device 12.

EPS·ECU 40 controls the steering assist torque by controlling EPS device 12 based on the steering torque Ts and the vehicle speed V detected by the driving operation sensor 90 and the vehicle state sensor 92 described later. Thus, the steering load of the driver can be reduced. Further, EPS·ECU 40 can steer the front wheel 16FL and 16FR as needed by controlling EPS device 12. Thus, EPS·ECU 40 and EPS device 12 functions as an automatic steering device 42 that automatically steers the front wheels as needed.

A camera sensor 52 and a radar sensor 54 are connected to the driving assistance ECU 50. The camera sensor 52 and the radar sensor 54 each include a plurality of camera devices and a plurality of radar devices. The camera sensor 52 and the radar sensor 54 function as a target information acquisition device 56 that acquires information on a target at least in front of the vehicle 102. In addition to the radar sensor 54, or in addition to the radar sensor 54, light detection and ranging (LiDAR) may be used.

Further, a setting operation device 58 is connected to the driving assistance ECU 50, and the setting operation device 58 is provided at a position operated by the driver. Although not shown in FIG. 1, in an embodiment, the setting operation device 58 includes a remote operation switch.

The driving ECU 60 is connected with a driving device 62 that accelerates the vehicle 102 by applying a driving force to driving wheels not shown in FIG. 1. In a normal state, the driving ECU 60 controls the driving device so that the driving force generated by the driving device 62 changes in response to a driving operation by the driver, and when a command signal is received from the driving assistance ECU 50, controls the driving device 62 based on the command signal.

A braking device 72 is connected to the braking ECU 70 to decelerate the vehicle 102 by braking by applying braking force to wheels not shown in FIG. 1. In a normal state, the braking ECU 70 controls the braking device such that the braking force generated by the braking device 72 changes in response to a braking operation by the driver. Upon receiving the command signal from the driving steering assistance ECU 50, the braking ECU 70 performs the automated braking by controlling the braking device 72 based on the command signal.

The driving operation sensor 90 and the vehicle state sensor 92 are connected to CAN 104. Information (referred to as sensor information) detected by the driving operation sensor 90 and the vehicle state sensor 92 is transmitted to CAN 104. The driving operation sensor 90 includes a driving operation amount sensor and a braking operation amount sensor. The vehicle state sensor 92 includes a vehicle speed sensor, a longitudinal acceleration sensor, a lateral acceleration sensor, a yaw rate sensor, and the like.

Further, a transmission and reception device 94 is connected to CAN 104. The transmission and reception device 94 communicates with the terminal device 96 such as a smart phone through a radio communication such as Bluetooth (registered trademark) or an Internet-based communication. The driving assistance ECU 50 controls the automatic steering device 42 to automatically steer the front wheel 16FL and 16FR based on a command inputted from the terminal device 96 via the transmission and reception device 94, and controls the driving device 62 and the braking device 72 to control the braking and driving force, thereby performing remote driving control.

The driving assistance ECU 50 is a central control device that performs driving support control such as remote driving control, midpoint offset amount detecting control of the steering torque sensor, midpoint correction control of the steering torque sensor, and lane keeping control. In the embodiment, the driving assistance ECU 50 performs the remote driving control in cooperation with the transmission and reception device 94, the terminal device 96, and the other ECU when the remote driving switch is on and the application of the remote driving control of the terminal device 96 is activated.

Note that the remote driving control may be at least one of a remote parking control, an automatic valley parking control, and a smart summon control in which a driver or another user operates the terminal device 96 to remotely control the vehicle. The remote parking control is a control in which the vehicle is parked at a predetermined parking position by remote operation in a state in which the driver gets off, and the vehicle is discharged from the parking position. Automatic valley parking control is control in which, in a parking lot or the like of a large facility, the transfer of the vehicle and the reciprocation to and from the parking position, the parking, and the exit are performed by unmanned automatic traveling except when the user gets on and off at the entrance. The smart summon control is a control in which a driver calls a vehicle to a position of the driver or a designated position by automatic driving without getting on the vehicle. The remote driving control does not constitute the gist of the present disclosure, and may be performed in any manner known in the art.

Further, the driving assistance ECU 50 performs the midpoint offset amount detecting control of the steering torque sensor in a state where the remote driving control is performed, and thereby stores the steering torque Ts detected by the steering torque sensor 38 in the storage device 50A as the midpoint offset amount Tsoff of the steering torque sensor. Further, the driving assistance ECU 50 performs midpoint correction for correcting the steering torque Ts detected by the steering torque sensor 38 with the midpoint offset amount Tsoff by performing midpoint correction control of the steering torque sensor during traveling of the vehicle 102.

First Embodiment

Figure 2:
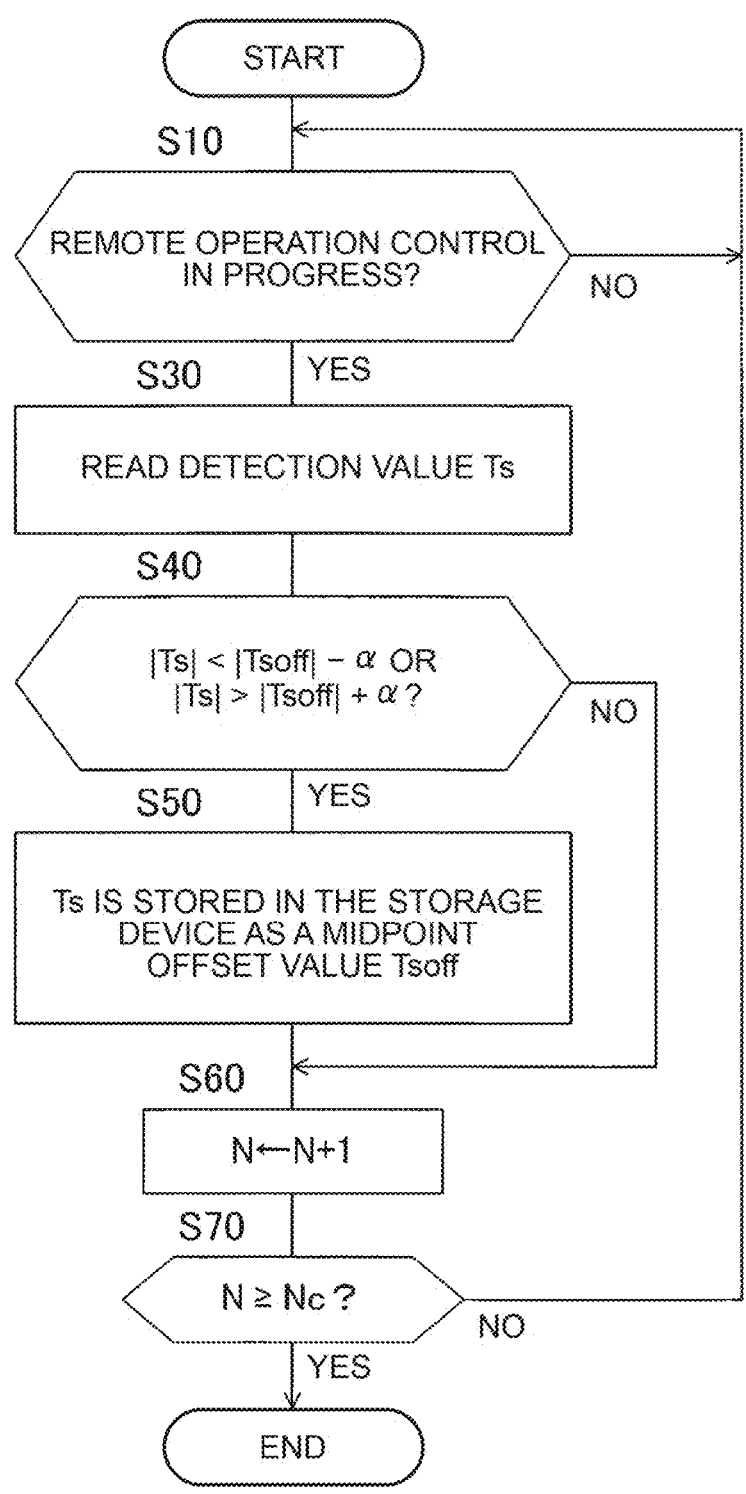
FIG. 2 is a flowchart showing a routine of midpoint offset amount detection control in the first embodiment.
Figure 3:
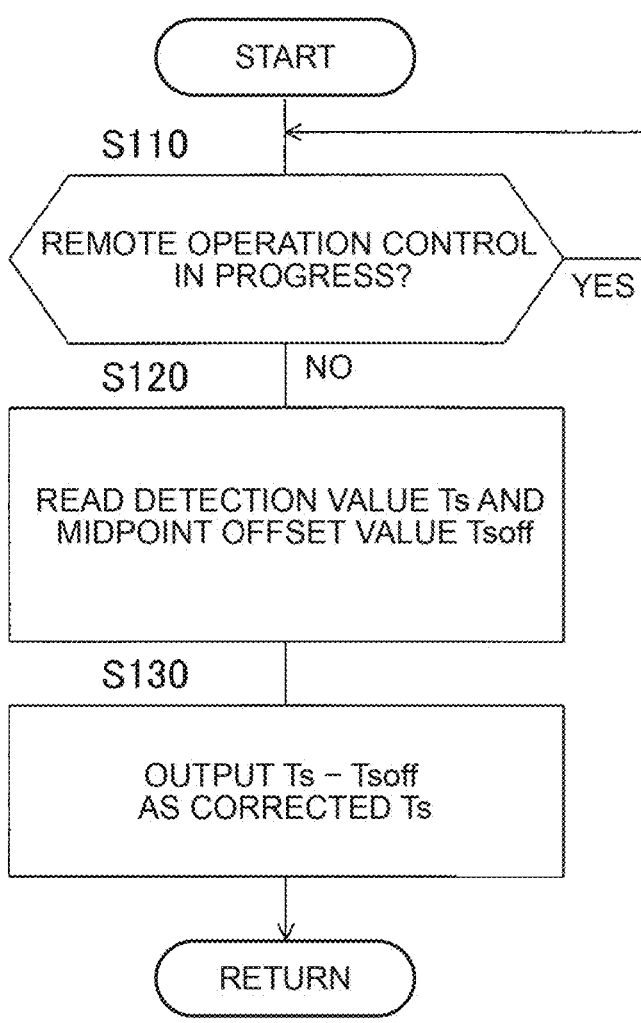
FIG. 3 is a flowchart showing a routine of midpoint correction control in the first embodiment.

In the first embodiment, ROM of the steering assistance ECU 50 stores a program of midpoint offset amount detecting control of the steering torque sensor corresponding to the flow charts shown in FIGS. 2 and 3, and a program of midpoint correction control of the steering torque sensor. CPU performs midpoint offset amount detecting control of the steering torque sensor and midpoint correction control of the steering torque sensor according to these programs.

Middle Point Offset Amount Detection Control Routine of the First Embodiment The midpoint offset amount detecting control according to the flow chart shown in FIG. 2 is repeatedly executed at predetermined intervals by CPU of the driving assistance ECU 50 when the remote driving switch of the setting operation device 58, which is not shown in FIG. 1, is on. At the start of the midpoint offset amount detection control, a count value N (an integer equal to or greater than 0) indicating the number of times of detection of the midpoint offset amount to be described later is reset to 0, which is an initial value. The same applies to the midpoint offset amount detection control in other embodiments described later.

First, in S10, CPU determines whether or not the remote operation control is being performed, that is, whether or not the remote operation control for controlling the autopilot and the braking/driving force is being performed, based on a command inputted from the terminal device 96 via the transmission and reception device 94. The vehicle 102 may be in any of a traveling state and a stationary state. When a negative determination is made, S10 is executed again, and when an affirmative determination is made, the present control proceeds to S30.

In S30, CPU reads the steering torque Ts detected by the steering torque sensor 38 from EPS-ECU 40 via CAN 104.

In S40, CPU determines whether or not the midpoint offset quantity Tsoff of the steering torque sensor needs to be updated. Specifically, it is determined whether or not the absolute value of the steering torque Ts is smaller than the value obtained by subtracting α from the absolute value of the midpoint offset amount Tsoff stored in the storage device 50A, or is larger than the sum of the absolute value of the midpoint offset amount Tsoff and α, where α is a positive constant. When a negative determination is made, the present control proceeds to S60, and when an affirmative determination is made, the present control proceeds to S50.

In S50, CPU stores the steering torque Ts as the midpoint offset quantity Tsoff of the steering torque sensor in the storage device 50A.

In S60, CPU increments the count value N, which indicates the number of times the midpoint offset is detected, by one.

In S70, CPU determines whether or not the count value N is equal to or greater than a reference value Nc (for example, a positive constant integer such as 3). CPU returns to S10 when a negative determination is made, and ends the control when an affirmative determination is made.

Midpoint Correction Control Routine of the First Embodiment

The midpoint correction control according to the flow chart shown in FIG. 3 is repeatedly executed at predetermined intervals by CPU of the driving assistance ECU 50 when the ignition switch not shown in FIG. 1 is on. Note that the midpoint correction control according to the flow chart shown in FIG. 3 may be repeatedly executed at predetermined intervals by CPU of EPS·ECU 40.

First, in S110, CPU determines whether or not remote operation control is in progress, similarly to S10. The vehicle 102 may be in any of a traveling state and a stationary state. When an affirmative determination is made, the present control is temporarily terminated, and when a negative determination is made, the present control proceeds to S120.

In S120, CPU reads the steering torque Ts detected by the steering torque sensor 38 from EPS·ECU 40 via CAN 104. Further, CPU reads the midpoint offset-amount Tsoff from the storage device 50A.

In S120, CPU outputs, as the corrected steering torque Ts, a value Tsoff obtained by subtracting the midpoint offset amount Ts-Tsoff from the steering torque Ts. Note that the corrected steering torque Ts may be used for various driving support controls of the vehicle 102 in addition to the control of the steering assist torque.

Second Embodiment

Figure 4:
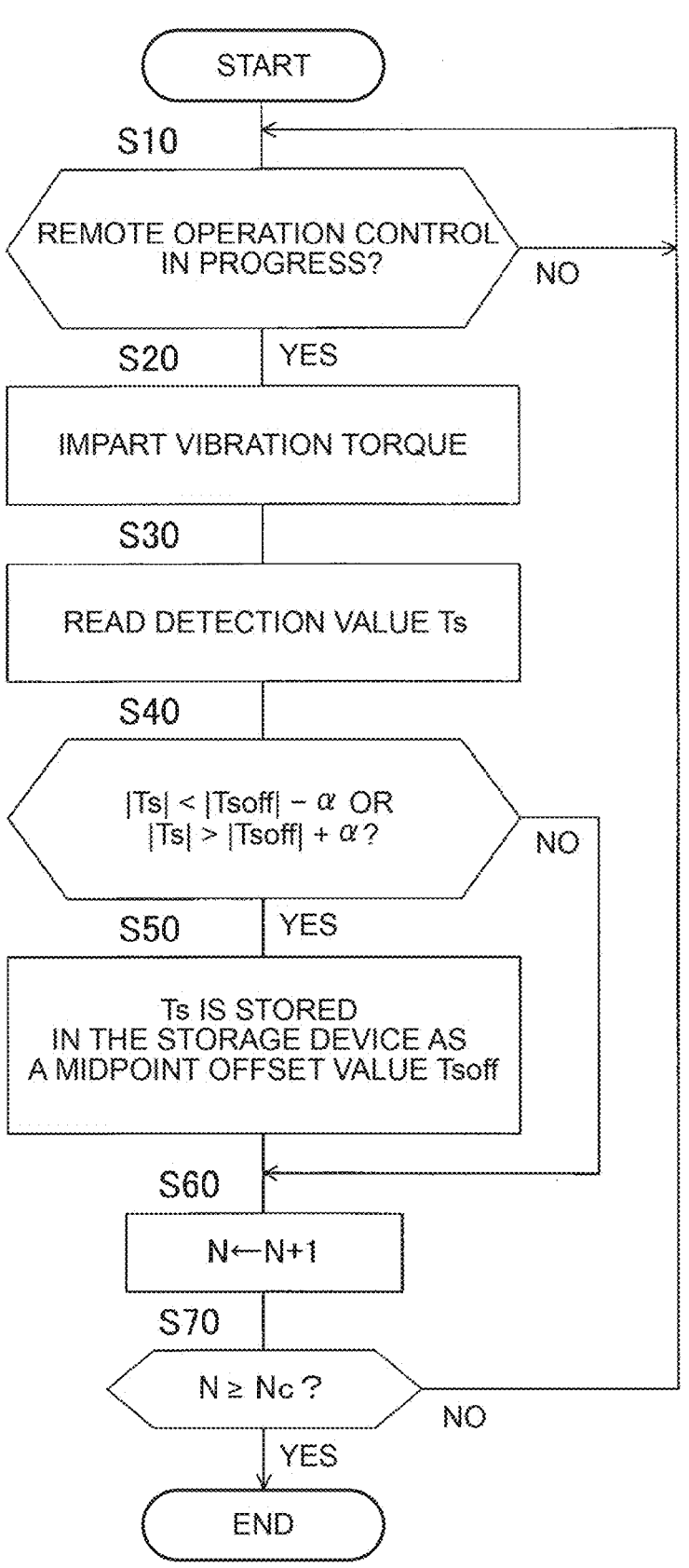
FIG. 4 is a flow chart showing a routine of midpoint offset amount detecting control according to the second embodiment.

In the second embodiment, ROM of the steering assistance ECU 50 stores a program of midpoint offset amount detecting control of the steering torque sensor corresponding to the flow charts shown in FIGS. 4 and 3, and a program of midpoint correction control of the steering torque sensor. CPU performs midpoint offset amount detecting control of the steering torque sensor and midpoint correction control of the steering torque sensor according to these programs. Since the midpoint correction control of the steering torque sensor is the same as the midpoint correction control of the steering torque sensor in the first embodiment, the description of this control is omitted.

Middle Point Offset Amount Detection Control Routine of the Second Embodiment In the second embodiment, when an affirmative determination is made in S10, the present control proceeds to S20. As can be seen from comparing FIG. 4 with FIG. 2, the steps other than S20 are carried out as in the first embodiment.

In S20, CPU outputs a command signal to EPS·ECU 40 to apply vibrational torque to the steering shaft 22 of the steering transmission system 34 by EPS device 12. The vibration torque is a vibration torque that can release residual torque of the steering shaft due to, for example, frictional friction between the steering shaft 22 and a support device that rotatably supports the steering shaft, and does not steer the front wheel 16FL and 16FR.

Third Embodiment

In the third embodiment, although not shown in FIG. 1, the camera sensor 52 includes a driver monitor camera that captures an image of the periphery of the vehicle 102 and a driver's monitor camera that captures an image of the driver's seat from the front to the rear. Although not shown in FIG. 1, the driving operation sensor 90 includes a touch sensor. The touch sensor is provided on the steering wheel 14 and detects that the steering wheel is held by the driver's hand.

Figure 5:
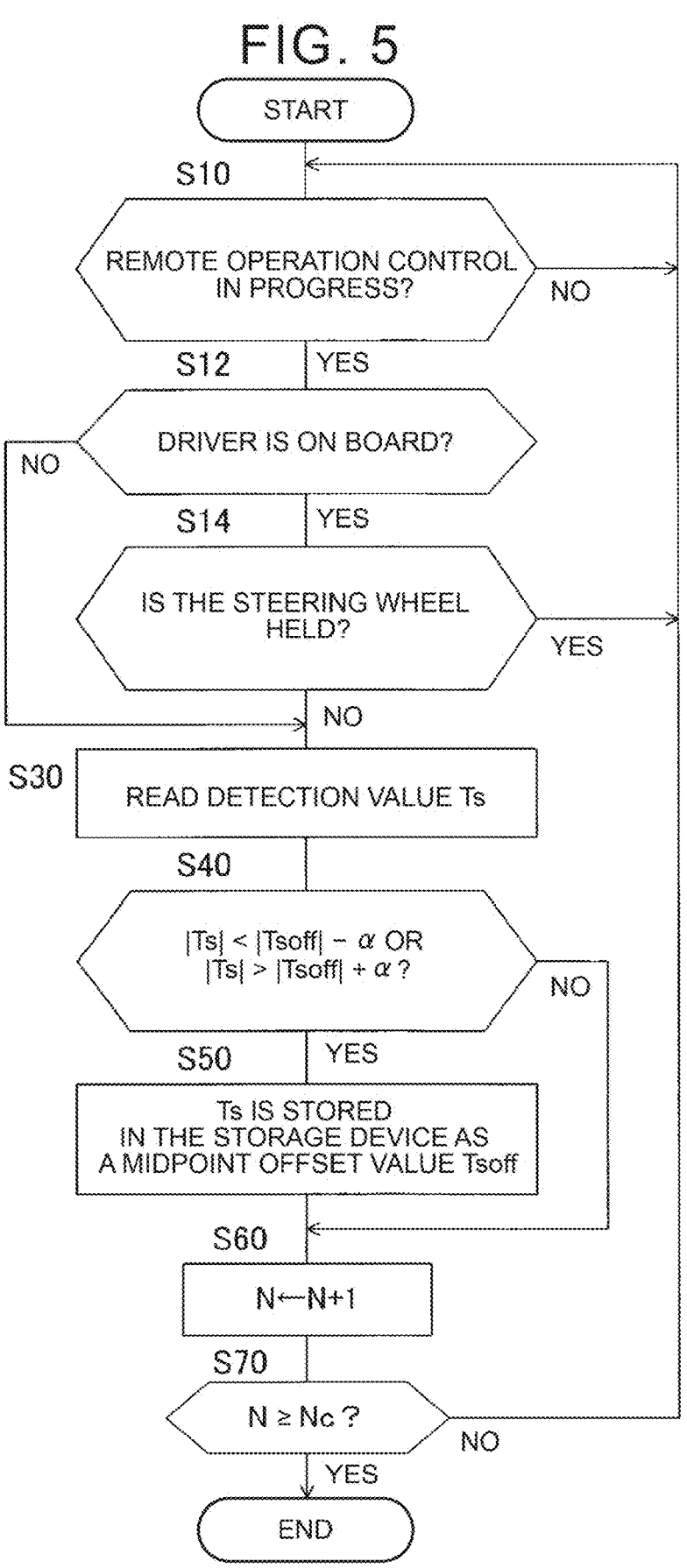
FIG. 5 is a flowchart illustrating a routine of midpoint offset amount detection control according to the third embodiment.

Further, in the third embodiment, ROM of the steering assistance ECU 50 stores a program of midpoint offset amount detecting control of the steering torque sensor corresponding to the flowcharts shown in FIGS. 5 and 3, respectively, and a program of midpoint correction control of the steering torque sensor. CPU performs midpoint offset amount detecting control of the steering torque sensor and midpoint correction control of the steering torque sensor according to these programs. Since the midpoint correction control of the steering torque sensor is the same as the midpoint correction control of the steering torque sensor in the first embodiment, the description of this control is omitted.

Middle Point Offset Amount Detection Control Routine of the Third Embodiment In the third embodiment, when an affirmative determination is made in S10, the present control proceeds to S12. As can be seen from comparing FIG. 5 with FIG. 2, the steps other than S12 and S14 are performed as in the first embodiment.

In S12, CPU determines whether or not the driver rides on the vehicle 102 and sits on the driver's seat based on the analysis of the images captured by the driver monitor camera. When a negative determination is made, the present control proceeds to S30, and when an affirmative determination is made, the present control proceeds to S14.

In S14, CPU determines whether or not the steering wheel 14 is held by the driver's hand based on the detection result of the touch sensor. When an affirmative determination is made, the present control returns to S10, and when a negative determination is made, the present control proceeds to S30.

As can be seen from the above explanation, according to the embodiments, the steering torque Ts detected by the steering torque sensor 38 is stored in the nonvolatile storage device 50A as the midpoint offset quantity Tsoff of the steering torque sensor in a S10 condition in which the remote driving control of the vehicles is performed. In a situation where the remote driving control of the vehicle is performed, the driver gets off, so that no torque acts on the steering transmission system 34 and the steering torque sensor 38. Thus, steering torque detected by the steering torque sensor in a situation in which no torque is acting on the steering torque sensor can be stored in the nonvolatile storage device as an accurate midpoint offset amount of the steering torque sensor.

Further, the midpoint offset amount is read from the storage device during traveling of the vehicle, and the steering torque Ts detected by the steering torque sensor is corrected by the midpoint offset amount Tsoff. Accordingly, steering torque detected by the steering torque sensor can be corrected by an accurate midpoint offset amount while the vehicle is traveling.

Further, according to each of the embodiments, since the remote driving control includes at least one of the remote parking control, the automatic valley parking control, and the smart summon control, the accurate midpoint offset amount of the steering torque sensor 38 can be determined when the at least one control is being performed.

In particular, according to the first and second embodiments, the vehicle only needs to be a vehicle capable of performing remote driving control, and a special device such as a camera that captures an image of a driver in order to detect a situation in which no torque is acting on the steering shaft 22 is unnecessary.

Further, according to the second embodiment, by applying the vibrating torque to the steering transmission system 34, the torque remaining in the steering transmission system is released, and the steering torque Ts detected by the steering torque sensor 38 thereafter is stored in the storage device 50A as the midpoint offset quantity Tsoff of the steering torque sensor. Thus, in comparison with when the vibration torque is not applied to the steering transmission system, the concern that the middle point offset amount will be adversely affected by the torque remaining in the steering transmission system is reduced, and the middle point offset amount can be obtained more accurately.

The example embodiments of the disclosure are described in detail above; however, the disclosure is not limited to the above-described embodiments. It is apparent to persons skilled in the art that various other embodiments may be implemented within the scope of the disclosure.

For example, in the above-described embodiments, based on the steering torque Ts detected by the steering torque sensor 38 and read in S30, it is determined whether or not the midpoint offset quantity Tsoff of the steering torque sensor needs to be updated in S40. However, the steering torque used for the determination in S40 may be a mean of the steering torque Ts read in S30 over a predetermined control-cycle.

Further, in the above-described embodiment, in S60, the count value N indicating the number of times of detecting the midpoint offset amount is incremented by 1, and in S70, it is determined whether or not the count value N is equal to or greater than the reference value Nc. When a negative determination is made, the present control returns to S10. However, S60 and S70 may be omitted, and S30 to S50 may be repeatedly executed while the remote operation control is executed.

Further, in the second embodiment, in S20, EPS device 12 applies vibrational torque to the steering shaft 22 of the steering transmission system 34, and thereafter, in S30, the steering torque Ts detected by the steering torque sensor 38 is read. However, when an affirmative determination is made first in S10, a S20 is executed, and when an affirmative determination is made second time or later in S10, S20 is skipped, and the present control may proceed to S30 without executing S20.

Further, in the third embodiment, when it is determined that the driver is seated in the driver's seat in S12, it is determined whether or not the steering wheel 14 is held by the driver's hand in S14. If a further negative determination is made, the present control proceeds to S30. However, one of S12 and S14 may be omitted. When S14 is omitted, the present control returns to S10 when an affirmative determination is made in S12, and when a negative determination is made, the present control proceeds to S30.

Furthermore, in the third embodiment, no S20 is performed. However, S20 may also be performed in the third embodiment.

What is claimed is:

1. A midpoint correction device for a steering torque sensor implemented in a vehicle that is equipped with a torque applying device for applying control torque to a steering transmission system between a steering wheel and a steered wheel, and a steering torque sensor provided in the steering transmission system between the steering wheel and the torque applying device, and that is configured to perform midpoint correction of the steering torque sensor, the midpoint correction device comprising:

a control unit that performs remote driving control of the vehicle by communicating with a terminal device, wherein the control unit includes a nonvolatile storage device, and is configured to perform the midpoint correction by storing, in the storage device, steering torque detected by the steering torque sensor in a state in which the remote driving control is performed, as a midpoint offset amount of the steering torque sensor, reading the midpoint offset amount from the storage device during traveling of the vehicle, and correcting steering torque detected by the steering torque sensor by the midpoint offset amount.

2. The midpoint correction device according to claim 1, wherein the control unit is configured to store, in the storage device, steering torque detected by the steering torque sensor after vibration torque is applied to the steering transmission system by the torque applying device, as a midpoint offset amount of the steering torque sensor.

3. The midpoint correction device according to claim 1, wherein the remote driving control includes at least one of remote parking control, automatic valet parking control, and smart summon control.

4. A midpoint correction method of a steering torque sensor, for performing midpoint correction of the steering torque sensor implemented in a vehicle that is equipped with a torque applying device for applying control torque to a steering transmission system between a steering wheel and a steered wheel, and the steering torque sensor provided in the steering transmission system between the steering wheel and the torque applying device, the midpoint correction method comprising:

storing, in a situation in which remote driving control of the vehicle is being performed by communicating with a terminal device, steering torque detected by the steering torque sensor as a midpoint offset amount of the steering torque sensor, in a nonvolatile storage device, and reading the midpoint offset amount from the storage device during traveling of the vehicle and correcting steering torque detected by the steering torque sensor by the midpoint offset amount.

5. A non-transitory storage medium storing a midpoint correction program for a steering torque sensor, the midpoint correction program causing an electronic control unit installed in a vehicle to execute midpoint correction of the steering torque sensor implemented in the vehicle that is equipped with a torque applying device for applying control torque to a steering transmission system between a steering wheel and a steered wheel, and the steering torque sensor provided in the steering transmission system between the steering wheel and the torque applying device, the midpoint correction program comprising:

storing, in a situation in which remote driving control of the vehicle is being performed by communicating with a terminal device, steering torque detected by the steering torque sensor as a midpoint offset amount of the steering torque sensor, in a nonvolatile storage device, and reading the midpoint offset amount from the storage device during traveling of the vehicle and correcting steering torque detected by the steering torque sensor by the midpoint offset amount.

* * * * *